July 3, 1951     H. DICK, JR     2,559,283
MULTIPLE PURPOSE RADIAL SAW

Filed Oct. 24, 1949     2 Sheets-Sheet 1

HENRY DICK JR.
INVENTOR.

BY James D. Givnan
ATT'Y

July 3, 1951 H. DICK, JR 2,559,283
MULTIPLE PURPOSE RADIAL SAW

Filed Oct. 24, 1949 2 Sheets-Sheet 2

HENRY DICK JR
INVENTOR.

Patented July 3, 1951

2,559,283

UNITED STATES PATENT OFFICE 2,559,283

MULTIPLE PURPOSE RADIAL SAW

Henry Dick, Jr., Portland, Oreg.

Application October 24, 1949, Serial No. 123,283

1 Claim. (Cl. 143—6)

This invention relates to improvements in multiple purpose radial saws.

It is one of the principal objects of the invention to provide a saw of this character which is of simple, efficient, durable and inexpensive construction and which includes means for conveniently and accurately positioning and setting the saw for operation in a vertical plane from 90 degrees center through 30 degrees on each side of center. Means are also included for setting the saw for operation from a vertical position through 45 degrees off the vertical for bevel cutting and the like.

A further object is the provision of a machine of this character wherein the saw when set in any of the aforesaid positions is movable in a horizontal plane parallel to a fixed table top instead of in an arc, as heretofore.

A still further object is the provision of means for setting the saw for operation lengthwise of the table top in a path parallel to a rip fence adjustably mounted on the table top.

The foregoing and other objects will appear as my invention is morely fully hereinafter described in the following specification, illustrated in the accompanying drawings and finally pointed out in the appended claim.

Figure 1:
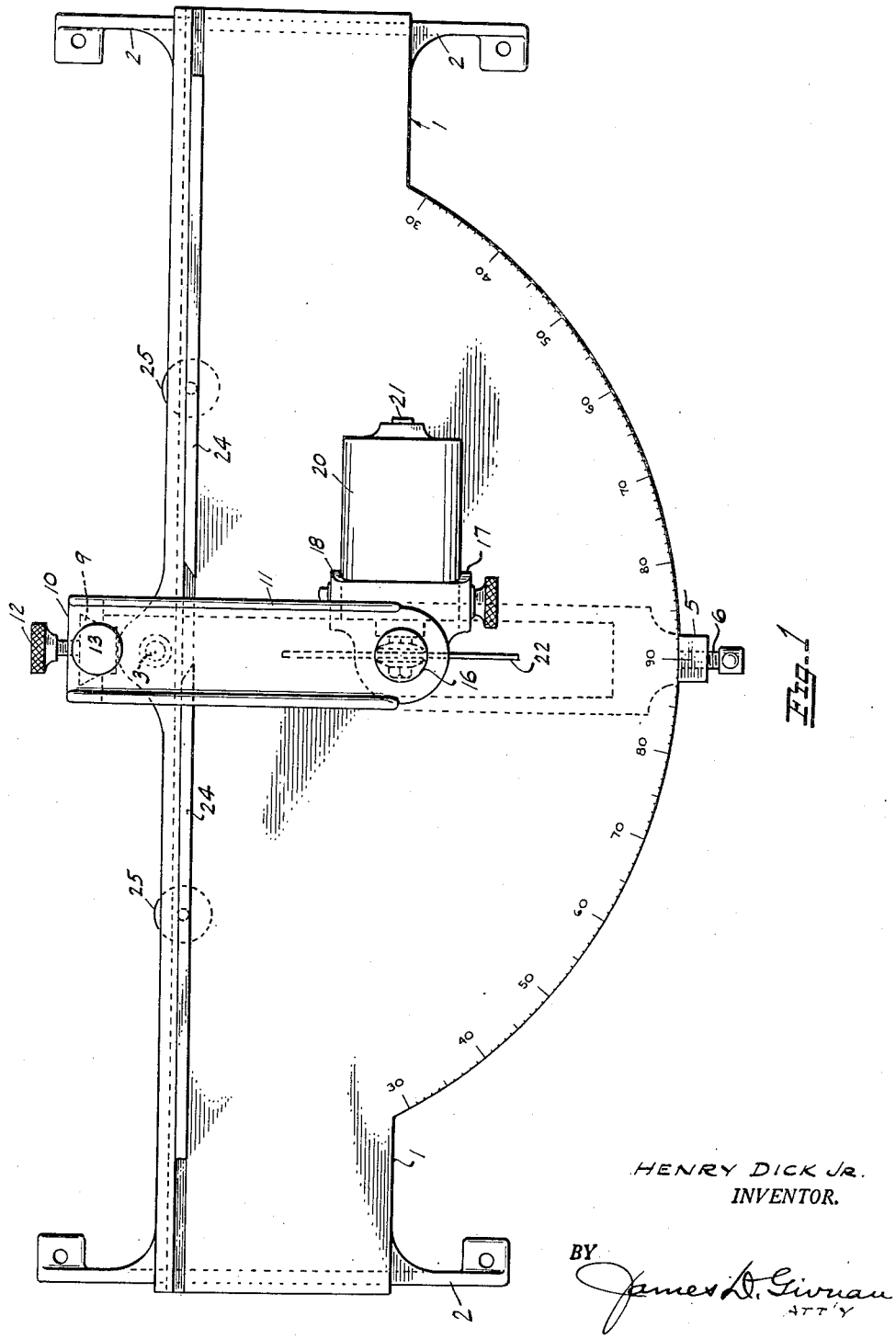
Figure 1 is a top plan view of a radial saw made in accordance with my invention.
Figure 2:
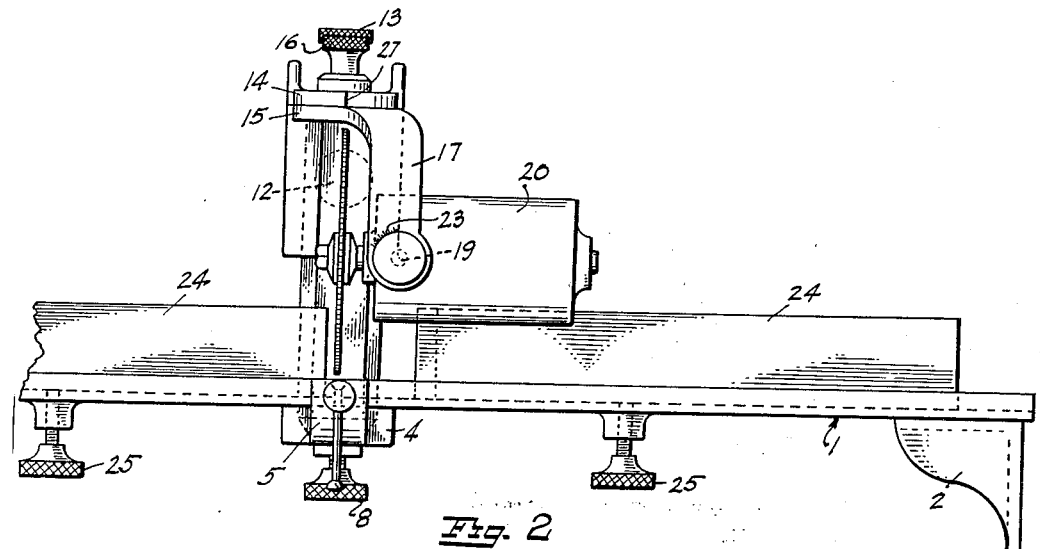
Figure 2 is a fragmentary front elevation of Figure 1.
Figure 3:
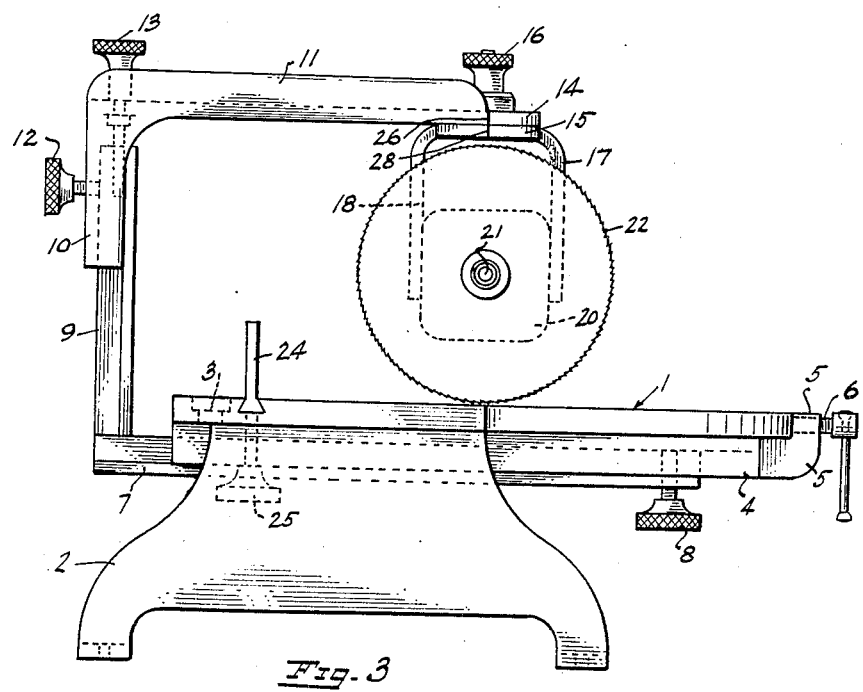
Figure 3 is an end elevation of Figure 1 from the left hand side thereof.

Referring now more particularly to the drawings:

Reference numeral 1 indicates generally a table secured to or formed integral with any approved type of supporting legs indicated 2. The forward edge of the table is of arcuate shape as shown in Figure 1 and has inscribed on its top surface graduations ranging from 90 degrees at the center to 30 degrees on both sides of the center.

To the underside of the table top I pivotally mount by means of a pivot pin 3, a track 4, turned upwardly as at 5 into contact with the arcuate edge of the table top. This outer end of the track is provided with a locking screw 6 adapted to bear against the edge of the table top for locking the track in any adjusted position in relation to the graduations on the table top. Slidably mounted lengthwise within the track 4 is a carriage 7 which, when desired, may be locked to the track by a set screw 8.

The rear end of the carriage 7 is provided with a vertical column 9 with which is slidably engaged a downwardly extended portion 10 of a bracket 11. The bracket may be locked in various vertically adjusted positions with respect to the column 9 by means of a set screw 12. The bracket 11 may be minutely adjusted with respect to the column 9 by means of an adjusting screw 13. The outer end of the bracket 11 terminates in a bearing plate 14 to which is rotatably attached a companion bearing plate 15. The plates may be locked in fixed relation to each other by means of a lock nut 16. The plate 15 is formed with a pair of depending arms 17 and 18, to whose lower ends I pivotally attach by means of bolts 19, a motor 20. To one end of the shaft 21 of the motor I secure a circular saw 22. The motor is connected with any convenient source of electrical energy in the conventional manner by wires and a suitable switch (not shown).

By the arrangement thus far described, the saw by means of the bracket 11, column 9 and carriage 7 may be moved transversely of the table top in a horizontal plane or it may be moved across the table in any desired angle with relation thereto by merely moving the track 4 about its pivot point 3 to any desired location in accordance with the graduations on the table top. The saw 22, by means of the pivotal mounting 19 of the motor, may also be tipped to any desired angle from the vertical through 45 degrees off the vertical in accordance with graduations 23 formed on the arms 17 and 18.

By means of the bearing plates 14 and 15 the saw and motor may be rotated through 90 degrees into a position parallel to the length of the table and parallel to a rip fence 24 adjustably mounted lengthwise of the table top and lockable into various adjusted positions with respect to each other by means of locking bolts 25. For convenience in locating the motor and saw in these last mentioned positions, I provide the bearing plates 14 and 15 with marks 26—27 and 28 respectively.

The inner ends of the sections of the fence 24 are tapered on angles of 45 degrees to permit passage of the saw between the inner ends of the sections when they are drawn closely toward each other. By this arrangement a gap slightly greater than the width of the saw blade will exist between the inner ends of the sections of the fence so that relatively small work pieces may be dealt with and held securely against the fence.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A radial saw comprising in combination a horizontal table of arcuate shape across its front edge for the major portion of its length and terminating at both of its ends in inset front edges parallel to the rear edge of said table to serve as limit stops, a horizontal track disposed below said table and pivotally attached at one of its ends to the rear edge of said table and movable with respect thereto through various degrees of a circle defined by said arcuate portion toward each of said limit stops, the forward end of the track being turned upwardly into sliding contact with the front edge of said arcuate portion of the table, means extending through said upwardly turned portion of the track and engageable with said front edge of said arcuate portion for locking the track thereto in any adjusted position between said limit stops, a carriage slidably mounted in said track and extending rearwardly therefrom, a vertical column secured to the rear end of said track, a horizontal bracket terminating at its rear end in a downwardly extending portion slidably mounted on said column and lockable with respect thereto in various vertically adjusted positions, the opposite or forward end of said bracket terminating in a horizontal bearing plate, a companion bearing plate pivotally attached face to face to said first mentioned plate and lockable thereto in various rotatably adjusted positions, a pair of arms depending from said companion plate, a motor-driven saw pivotally attached to the lower ends of said arms whereby, through the medium of said track, column, bracket and arms, the saw may be moved forwardly and rearwardly with respect to said table through the degrees of a circle defined by said arcuate portion of the table toward said limit stops, and tilted to either side of a vertical plane and raised and lowered with respect to said table.

HENRY DICK, Jr.

REFERENCES CITED

The following references are of record in the file of this patent:

UNITED STATES PATENTS

| Number | Name | Date |
|---|---|---|
| 414,544 | Jacobs | Nov. 5, 1889 |
| 1,528,536 | De Walt | Mar. 3, 1925 |
| 1,628,845 | Jackson | May 17, 1927 |
| 1,646,589 | Meek et al. | Oct. 25, 1927 |
| 1,808,453 | De Koning | June 2, 1931 |
| 1,842,630 | Rodning | Jan. 26, 1932 |
| 2,022,289 | Knapp | Nov. 26, 1935 |
| 2,291,999 | Wilson et al. | Aug. 4, 1942 |